(12) United States Patent
Uemura et al.

(10) Patent No.: US 10,658,964 B2
(45) Date of Patent: May 19, 2020

(54) MOTOR DRIVING APPARATUS, VACUUM CLEANER, AND HAND DRYER

(71) Applicant: Mitsubishi Electric Corporation, Tokyo (JP)

(72) Inventors: Keisuke Uemura, Tokyo (JP); Yuji Takayama, Tokyo (JP); Yosuke Shinomoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/770,239

(22) PCT Filed: Nov. 2, 2015

(86) PCT No.: PCT/JP2015/080955
§ 371 (c)(1),
(2) Date: Apr. 23, 2018

(87) PCT Pub. No.: WO2017/077579
PCT Pub. Date: May 11, 2017

(65) Prior Publication Data
US 2018/0316297 A1    Nov. 1, 2018

(51) Int. Cl.
*H02P 25/04* (2006.01)
*H02P 6/06* (2006.01)
(Continued)

(52) U.S. Cl.
CPC .............. *H02P 25/04* (2013.01); *A47K 10/48* (2013.01); *A47L 9/2831* (2013.01);
(Continued)

(58) Field of Classification Search
CPC .. H02P 25/04; H02P 21/22; H02P 6/06; H02P 26/026; A47K 10/48
(Continued)

(56) References Cited

U.S. PATENT DOCUMENTS

| 5,272,429 A | * | 12/1993 | Lipo | ....................... H02P 6/187 318/802 |
| 6,249,094 B1 | * | 6/2001 | Zeh | ......................... H02P 6/182 318/400.02 |

(Continued)

FOREIGN PATENT DOCUMENTS

| JP | 2000-324874 A | 11/2000 |
| JP | 2002-165477 A | 6/2002 |

(Continued)

OTHER PUBLICATIONS

Shinomoto, Y., Kawaguchi, H., & Ono, H. (Mitsubishi Electric Corp). "Constant Flow Control Inverter by Flow Sensorless for Permanent Magnet Motor". Joint Research Meeting on Rotating Machinery and Linear Drive, The Institute of Electrical Engineers of Japan. RM-08. (2008). (with English abstract)(cited in the PCT Search Report).

(Continued)

*Primary Examiner* — Kawing Chan
(74) *Attorney, Agent, or Firm* — Posz Law Group, PLC

(57) ABSTRACT

A motor driving apparatus drives an electric blower including a single-phase PM motor. The motor driving apparatus includes: a single-phase inverter that applies an alternating-current voltage to the single-phase PM motor; a rotor position detecting unit that outputs, to an inverter control unit, a position detecting signal corresponding to a rotational position of a rotor of the single-phase PM motor; a motor current detecting unit that outputs, to the inverter control unit, a signal corresponding to a motor current flowing to the single-phase PM motor; and the inverter control unit that outputs a driving signal to corresponding switching elements of the single-phase inverter on the basis of the position detecting signal and the motor current. The single-phase inverter performs control to increase or decrease effective electric power supplied to the single-phase PM (Continued)

motor. The air blower changes an air volume by the increase or decrease in effective electric power.

13 Claims, 14 Drawing Sheets

(51) Int. Cl.
| | |
|---|---|
| H02P 25/03 | (2016.01) |
| A47L 9/28 | (2006.01) |
| H02P 21/22 | (2016.01) |
| A47K 10/48 | (2006.01) |
| H02P 25/026 | (2016.01) |
| H02P 27/08 | (2006.01) |
| H02M 7/5395 | (2006.01) |
| H02M 7/5387 | (2007.01) |

(52) U.S. Cl.
CPC .......... *A47L 9/2842* (2013.01); *A47L 9/2868* (2013.01); *A47L 9/2889* (2013.01); *H02P 6/06* (2013.01); *H02P 21/22* (2016.02); *H02P 25/026* (2013.01); *H02P 25/03* (2016.02); *H02P 27/085* (2013.01); *H02M 7/5395* (2013.01); *H02M 7/53871* (2013.01)

(58) Field of Classification Search
USPC .................................................... 318/400.02
See application file for complete search history.

(56) References Cited

U.S. PATENT DOCUMENTS

| | | | | |
|---|---|---|---|---|
| 6,570,778 | B2* | 5/2003 | Lipo | H02P 1/44 318/807 |
| 8,648,552 | B2* | 2/2014 | Dai | H02P 6/14 318/34 |
| 2002/0149342 | A1 | 10/2002 | Nakata et al. | |
| 2007/0145941 | A1* | 6/2007 | Asada | D06F 37/304 318/811 |
| 2009/0104034 | A1* | 4/2009 | Takada | F04D 27/004 416/61 |
| 2010/0014327 | A1* | 1/2010 | Sakakibara | H02M 7/219 363/49 |
| 2010/0242549 | A1* | 9/2010 | Hosoito | D06F 37/306 68/139 |
| 2011/0074365 | A1* | 3/2011 | Nakayama | H02P 9/007 322/27 |
| 2011/0227522 | A1* | 9/2011 | Shinomoto | H02M 1/4225 318/400.29 |
| 2014/0062355 | A1 | 3/2014 | Wang et al. | |
| 2014/0312813 | A1* | 10/2014 | Murchie | A47L 9/2842 318/400.03 |
| 2015/0064023 | A1* | 3/2015 | Sasaki | H02P 6/06 417/43 |
| 2015/0145466 | A1* | 5/2015 | Ha | H02P 1/42 318/729 |
| 2015/0265121 | A1* | 9/2015 | Kim | H02K 21/16 15/319 |
| 2016/0173012 | A1* | 6/2016 | Nondahl | H02P 6/08 318/400.34 |

FOREIGN PATENT DOCUMENTS

| | | |
|---|---|---|
| JP | 3326126 B2 | 9/2002 |
| JP | 2003-204694 A | 7/2003 |
| JP | 2009-44873 A | 2/2009 |
| JP | 2009-232591 A | 10/2009 |
| JP | 2012-130378 A | 7/2012 |
| JP | 2014-050115 A | 3/2014 |

OTHER PUBLICATIONS

International Search Report of the International Searching Authority dated Dec. 8, 2015 for the corresponding international application No. PCT/JP2015/080955 (and English translation).
Office action dated Aug. 7, 2018 issued in corresponding JP patent application No. 2017-548544 (and English translation thereof).
Office Action dated Aug. 13, 2019 issued in corresponding JP patent application No. 2018-209809 (and English translation).

* cited by examiner

US 10,658,964 B2

MOTOR DRIVING APPARATUS, VACUUM CLEANER, AND HAND DRYER

CROSS REFERENCE TO RELATED APPLICATION

This application is a U.S. national stage application of International Patent Application No. PCT/JP2015/080955 filed on Nov. 2, 2015, the disclosure of which is incorporated herein by reference.

TECHNICAL FIELD

The present invention relates to a motor driving apparatus that drives a single-phase permanent magnet synchronous motor (hereinafter referred to as a single-phase permanent magnet (PM) motor as appropriate), and to a vacuum cleaner and a hand dryer each using the single-phase PM motor.

BACKGROUND

Various kinds of motors are available such as a brushed DC motor, an induction motor, and a PM motor, each of the motors having a single phase, three phases, or the like. Among these various motors, the single-phase PM motor does not use a brush that is a mechanical structure. For such a "brushless" structure of the single-phase PM motor, there is no brush wear unlike the brushed DC motor. This feature allows the single-phase PM motor to easily achieve long service life and high reliability.

Moreover, the single-phase PM motor is a highly efficient motor as compared with the induction motor because no secondary current flows to a rotor of the single-phase PM motor.

The single-phase PM motor also has the following advantages as compared with a three-phase PM motor having the number of phases different from that of the single-phase PM motor. The three-phase PM motor requires a three-phase inverter, whereas the single-phase PM motor requires only a single-phase inverter. The use of a commonly used full-bridge inverter as the three-phase inverter requires six switching elements, whereas the use of the full-bridge inverter in the single-phase PM motor requires four switching elements. Thus, an apparatus with the single-phase PM motor can be made smaller than with the three-phase PM motor.

The following Patent Literature 1 and Non Patent Literature 1 are disclosed as examples of prior literature relating to a system of driving the single-phase PM motor.

PATENT LITERATURE

Patent Literature 1: Japanese Patent Application Laid-open No. 2012-130378

Non Patent Literature

Non Patent Literature 1: Joint Research Meeting on Rotating Machinery and Linear Drive, The Institute of Electrical Engineers of Japan, "Constant Flow Control Inverter by Flow Sensorless for Permanent Magnet Motor"

Patent Literature 1 teaches that "a control unit for controlling the amount of energization for an electric blower estimates the air volume on the basis of the relationship among "the amount of energization, current, and the air volume" obtained in advance by experiment or the like, thereby performing control to decrease the amount of energization for the electric blower as the estimated air volume decreases when the estimated air volume falls within a first predetermined range, and the amount of energization is controlled such that the degree of vacuum in the dust chamber is substantially constant and has a value set in advance by experiment or the like in the air volume region falling within the first predetermined range". That is, in Patent Literature 1, the air volume of the electric blower is determined by the work done by the electric blower.

Patent Literature 1 controls the amount of energization in accordance with the estimated air volume as described above, where controlling the amount of energization alone can control apparent power but cannot control effective electric power and reactive power. That is, the control performed in Patent Literature 1 cannot individually control required effective electric power. Thus, a problem with the technique of Patent Literature 1 is that the current flowing to a motor is larger than the maximum efficiency point, which results in the reduced efficiency.

Non Patent Literature 1 describes a technique of performing control on the basis of the estimated air volume only for the three-phase PM motor, not for the single-phase PM motor. In particular, the single-phase instantaneous power which is the instantaneous power supplied to the single-phase PM motor pulsates sinusoidally or cosinusoidally at a frequency twice the electrical angular frequency. The method described in Non Patent Literature 1 thus poses a problem such as noise generated by pulsation associated with the rotational speed or the load torque caused by the pulsation of the single-phase instantaneous power.

SUMMARY

The present invention has been made in view of the above problems, and it is an object of the present invention to provide a motor driving apparatus capable of performing air volume control providing against the pulsation of single-phase instantaneous power for a single-phase PM motor, and to provide a vacuum cleaner and a hand dryer.

In order to solve the above problems and achieve the object, a motor driving apparatus according to the present invention drives an electric blower including a single-phase permanent magnet synchronous motor. The motor driving apparatus comprising: a single-phase inverter applying an alternating-current voltage to the single-phase permanent magnet synchronous motor; a position detecting unit outputting to an inverter control unit a position detecting signal that is a signal corresponding to a rotational position of a rotor of the single-phase permanent magnet synchronous motor; a current detecting unit outputting to the inverter control unit a signal corresponding to a motor current flowing to the single-phase permanent magnet synchronous motor; and the inverter control unit outputting a driving signal to corresponding one of switching elements of the single-phase inverter on a basis of the position detecting signal and the motor current. The single-phase inverter of the motor driving apparatus according to the present invention increases or reduces effective electric power supplied to the single-phase permanent magnet synchronous motor, and the air blower changes an air volume by the increase or reduce in the effective electric power.

The present invention can perform the air volume control corresponding to the pulsation of the single-phase instantaneous power for the single-phase PM motor.

DETAILED DESCRIPTION

A motor driving apparatus, a vacuum cleaner, and a hand dryer according to embodiments of the present invention will now be described in detail with reference to the drawings. Note that the present invention is not limited to the following embodiments.

First Embodiment

Figure 1:
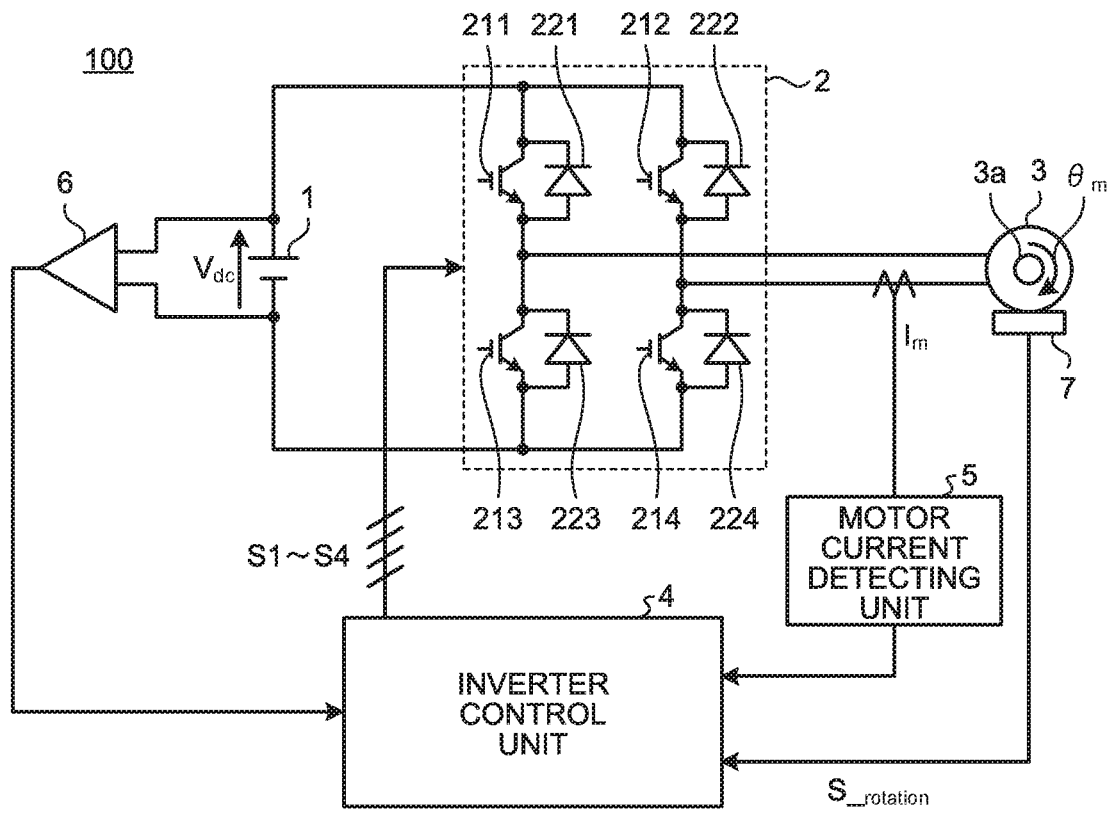
FIG. 1 is a diagram illustrating a configuration of a motor driving apparatus according to a first embodiment.

FIG. 1 is a diagram illustrating a configuration of a motor driving apparatus according to a first embodiment. A motor driving apparatus 100 according to the first embodiment is a motor driving apparatus that drives a load including a single-phase PM motor 3, and includes a direct-current power supply 1, a single-phase inverter 2, an inverter control unit 4, a motor current detecting unit 5, a direct-current power supply voltage detecting unit 6, and a rotor position detecting unit 7. The load including the single-phase PM motor 3 is, for example, a vacuum cleaner and a hand dryer each of which is equipped with an electric blower.

The direct-current power supply 1 supplies direct current power to the single-phase inverter 2. The single-phase inverter 2 includes switching elements 211 to 214 and diodes 221 to 224 connected in anti-parallel with the corresponding switching elements 211 to 214, respectively, and applies an alternating-current voltage to the single-phase PM motor 3. The inverter control unit 4 outputs driving signals S1 to S4 for the switching elements 211 to 214 of the single-phase inverter 2. The rotor position detecting unit 7 outputs, to the inverter control unit 4, a position detecting signal $S_{\_rotation}$ corresponding to a rotor rotational position $\theta_m$ which is a rotational position of a rotor 3a of the single-phase PM motor 3. The motor current detecting unit 5 outputs, to the inverter control unit 4, a signal corresponding to a motor current $I_m$ flowing through the single-phase PM motor 3. The direct-current power supply voltage detecting unit 6 detects a direct-current voltage $V_{dc}$ which is the voltage of the direct-current power supply 1. The driving signals S1 to S4 are pulse width modulation (hereinafter referred to as "PWM") signals generated on the basis of the rotor rotational position $\theta_m$ and the motor current $I_m$. The switching elements 211 to 214 of the single-phase inverter 2 are driven by the driving signals S1 to S4 which are PWM signals, thereby applying a given voltage to the single-phase PM motor 3.

Note that the direct-current power supply 1 may be a direct-current power supply that generates a direct-current voltage by rectifying and smoothing an alternating-current voltage from an alternating-current power supply with a diode bridge or the like, or may be a direct-current power supply typified by a solar cell, a battery, or the like. The switching element of the single-phase inverter 2 may be any switching element such as a transistor, an Insulated Gate Bipolar Transistor (IGBT), a Metal Oxide Semiconductor-Field Effect Transistor (MOS-FET), a thyristor, or a Gate Turn-Off Thyristor (GTO). Moreover, the switching element may be made of not only Si, which is a dominant semiconductor material for the above switching element, but any semiconductor material such as SiC or GaN referred to as a wide band-gap semiconductor.

Figure 2:
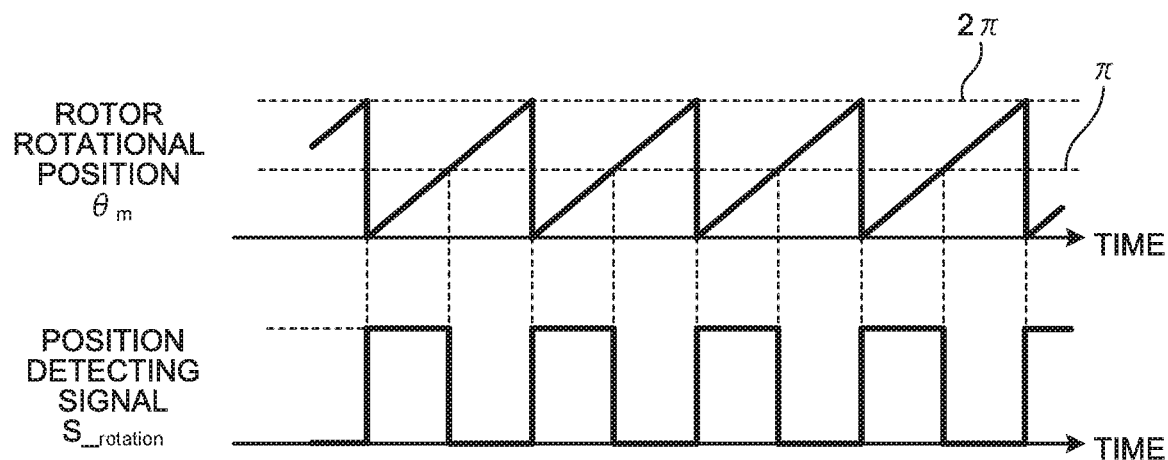
FIG. 2 is a diagram illustrating a relationship between a rotor rotational position and a position detecting signal according to the first embodiment.

The rotor position detecting unit 7 generates the position detecting signal $S_{\_rotation}$ corresponding to the rotor rotational position $\theta_m$ of the motor as illustrated in FIG. 2, for example, and outputs the position detecting signal to the inverter control unit 4. FIG. 2 illustrates an example in which the position detecting signal $S_{\_rotation}$, which is a pulse-shaped voltage signal corresponding to the rotor rotational position $\theta_m$, is output using a magnetic sensor such as a Hall sensor, and the position detecting signal is in a high level ($S_{\_rotation}$="High level") when $0 \leq \theta_m < \pi$, and is in a low level ($S_{\_rotation}$="Low level") when $\pi \leq \theta_m < 2\pi$. Note that the position detection sensor is not limited to the Hall sensor but may be an encoder or a resolver.

Figure 3:
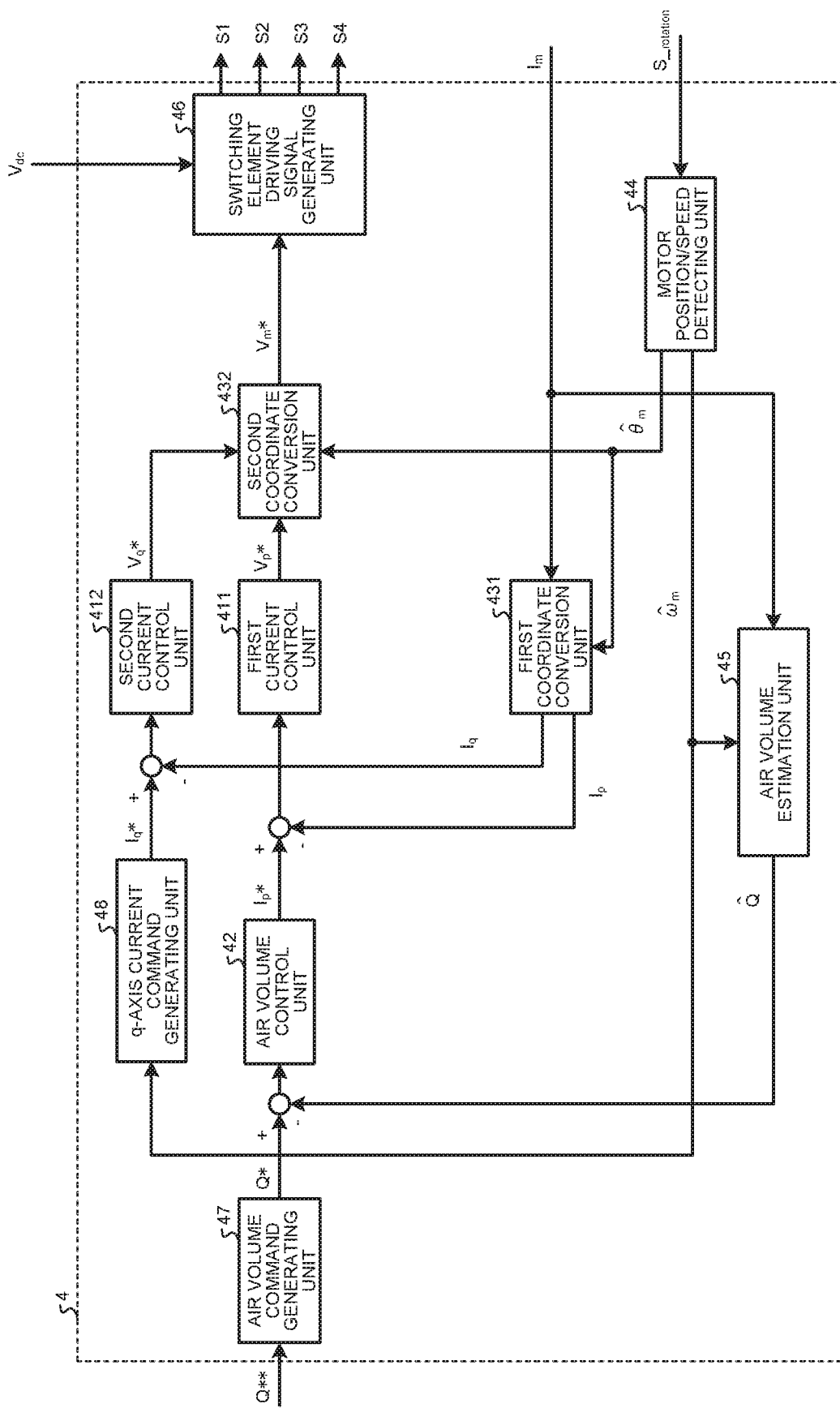
FIG. 3 is a block diagram illustrating a configuration of an inverter control unit according to the first embodiment.

FIG. 3 is a block diagram illustrating a configuration of the inverter control unit 4 according to the first embodiment. The inverter control unit 4 includes a first current control unit 411, a second current control unit 412, an air volume control unit 42, a first coordinate conversion unit 431, a second coordinate conversion unit 432, a motor position/speed detecting unit 44, an air volume estimation unit 45, a switching element driving signal generating unit 46, an air volume command generating unit 47, and a q-axis current command generating unit 48. The first current control unit 411 controls a p-axis current $I_p$. The second current control unit 412 controls a q-axis current $I_q$. The air volume control unit 42 controls an air volume estimate $\hat{Q}$. The first coordinate conversion unit 431 performs coordinate conversion to convert the expression in terms of a single-phase alternating-current into the expression using p and q axes (hereinafter referred to as "p-q axes"). The second coordinate conversion unit 432 converts the expression using the p-q axes into the expression in terms of the single-phase alternating-current. The motor position/speed detecting unit 44 detects a rotor rotational position estimate $\theta_m\hat{}$ and a motor speed estimate $\omega_m\hat{}$ in accordance with the position detecting signal $S_{\_rotation}$. The air volume estimation unit 45 estimates the air volume estimate $Q\hat{}$. The switching element driving signal generating unit 46 generates the switching element driving signals S1 to S4 from an inverter output voltage command $V_m^*$. The air volume command generating unit 47 generates an air volume command $Q^*$. The q-axis current command generating unit 48 generates a q-axis current command $I_q^*$. The details of each unit will be described below. Note that although the symbol "$\hat{}$" in "$\theta_m\hat{}$", "$Q\hat{}$", and the like should be placed above each of the characters "$\theta$" and "$Q$", such notation cannot be made in the present description. Thus, in the present description, the symbol "$\hat{}$" is placed after a corresponding character or character string except for ones placed in mathematical expressions that are inserted as images.

Figure 4:
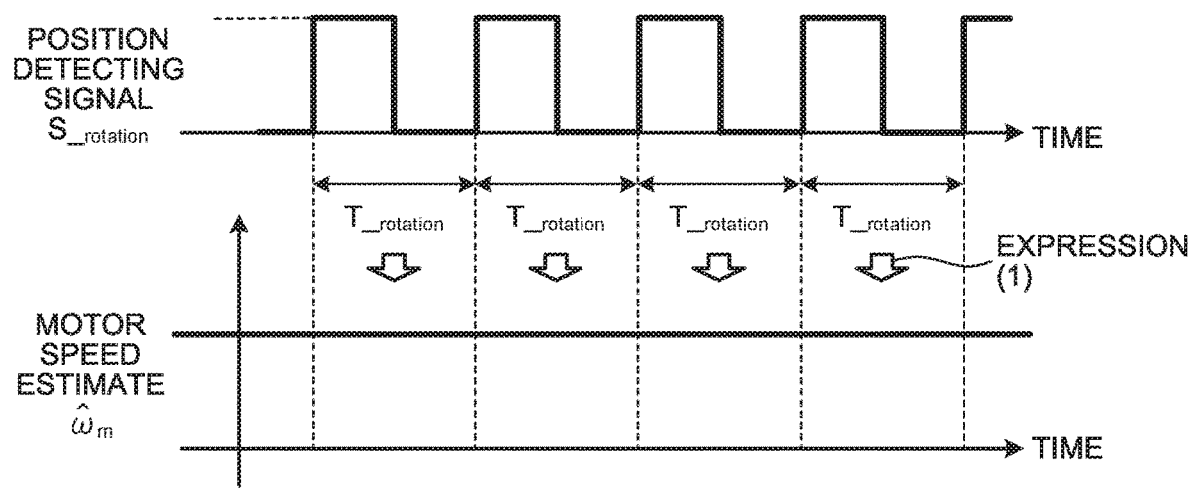
FIG. 4 is a diagram illustrating a relationship between the position detecting signal and a motor speed estimate according to the first embodiment.

First, the detailed operation of the motor position/speed detecting unit 44 will be described. As described above, the rotor position detecting unit 7 generates the position detecting signal $S_{\_rotation}$ as illustrated in FIG. 2 and outputs the position detecting signal to the motor position/speed detecting unit 44. FIG. 4 is a diagram illustrating a relationship between the position detecting signal $S_{\_rotation}$ and the motor speed estimate $\omega_m\hat{}$ according to the first embodiment. The motor position/speed detecting unit 44 can detect the motor speed estimate $\omega_m\hat{}$ according to below expression (1) using a period $T_{\_rotation}$ of the position detecting signal $S_{\_rotation}$. In the first embodiment, the number of pole pairs $P_m$ of the motor equals is one ($P_m=1$) but may be $P_m \neq 1$ as a matter of course. Note that when $P_m \neq 1$, an electrical angular speed $\omega_e$ and a motor speed $\omega_m$ that is a mechanical angular speed satisfy the relationship expressed as "$\omega_e = P_m \times \omega_m$".

[Expression 1]

$$\hat{\omega}_m = \frac{2\pi}{T_{\_rotation}} \quad (1)$$

Figure 5:
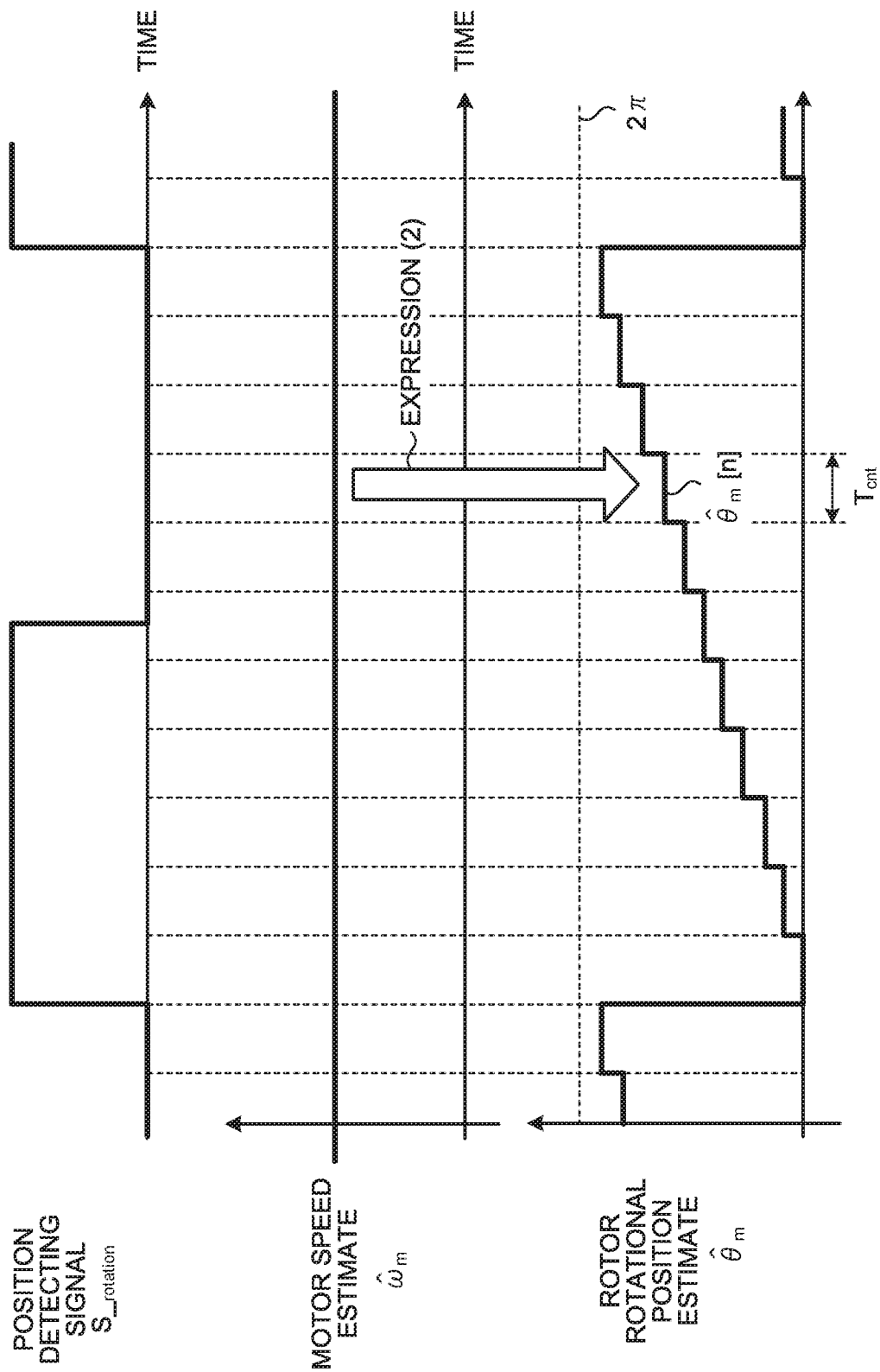
FIG. 5 is a diagram illustrating a relationship between the motor speed estimate and a rotor rotational position estimate according to the first embodiment.

FIG. 5 is a diagram illustrating a relationship between the motor speed estimate $\omega_m\hat{}$ and the rotor rotational position estimate $\theta_m\hat{}$ according to the first embodiment. As illustrated in FIG. 5 and below expression (2), the rotor rotational position estimate $\theta_m\hat{}$ can be calculated by integrating the motor speed estimate $\omega_m\hat{}$. Note that FIG. 5 illustrates an example assuming a discrete control system in a control period $T_{cnt}$, and the rotor rotational position estimate at a control timing n is expressed as $\theta_m\hat{}[n]$.

[Expression 2]

$$\hat{\theta}_m[n] = \hat{\theta}_m[n-1] + \omega_m[n] \times T_{cnt} \quad (2)$$

The motor speed estimate $\omega_m\hat{}$ and the rotor rotational position estimate $\theta_m\hat{}$ can thus be calculated from the position detecting signal $S_{\_rotation}$ through the use of above expressions (1) and (2). Note that the above method is merely an example of calculating the motor speed estimate $\omega_m\hat{}$ and the rotor rotational position estimate $\theta_m\hat{}$ from the period $T_{\_rotation}$ of the position detecting signal $S_{\_rotation}$, and thus, as a matter of course, another method may be used.

Figure 6:
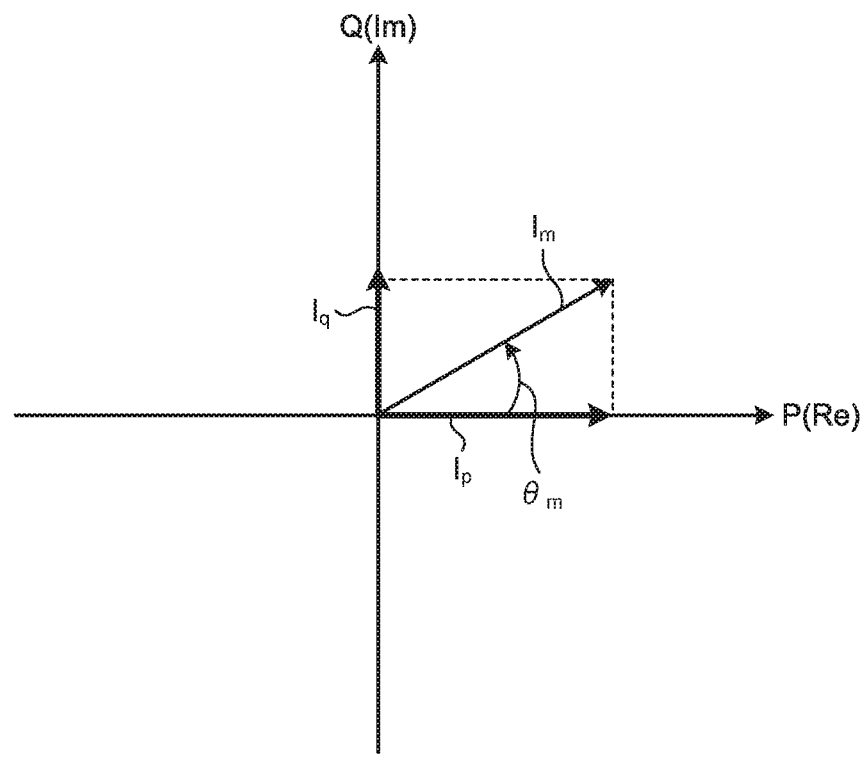
FIG. 6 is a graph illustrating a relationship between a motor current and a p-q axes current according to the first embodiment.

Next, the first coordinate conversion unit 431 performing the coordinate conversion to convert the expression in terms of the single-phase alternating-current into the expression using the p-q axes will be described. FIG. 6 is a graph illustrating a relationship between the motor current $I_m$ and each of the p-axis current $I_p$ and the q-axis current $I_q$. When the motor current $I_m$ representing the single-phase alternating-current is considered as a vector quantity in the polar coordinates system with the p axis and the q axis that are the two orthogonal coordinate axes, the p axis component and the q axis component can be expressed by below expressions (3-1) and (3-2).

[Expression 3]

$$I_p = I_m \cos(\hat{\theta}_m) \quad (3\text{-}1)$$

$$I_q = I_m \sin(\hat{\theta}_m) \quad (3\text{-}2)$$

Figure 7:
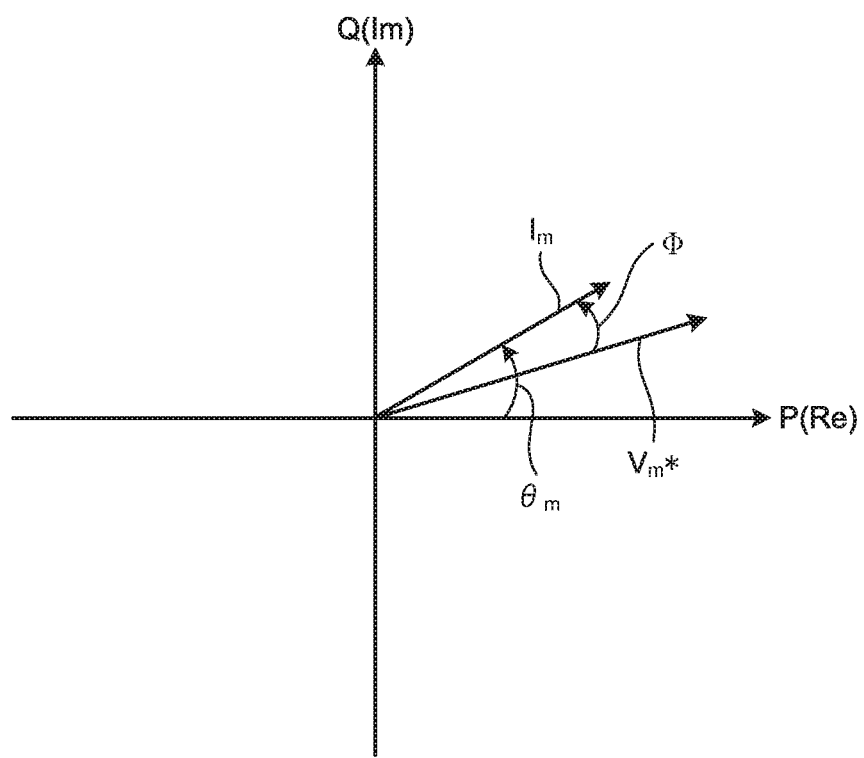
FIG. 7 is a graph illustrating a relationship between the motor current and an inverter output voltage according to the first embodiment.

An instantaneous value of the motor current $I_m$ is defined by below expression (4-1), and an instantaneous value of the inverter output voltage command $V_m^*$ is defined by below expression (4-2). In expression (4-1), $I_{m\_rms}$ represents a root mean square value of the motor current $I_m$. In expression (4-2), $V_{m\_rms}^*$ represents a root mean square value of the inverter output voltage command $V_m^*$. FIG. 7 illustrates the relationship between the motor current $I_m$ and the inverter output voltage command $V_m^*$, where $\Phi$ represents the phase difference between the inverter output voltage command $V_m^*$ and the motor current $I_m$. In expressions (4-1) and (4-2) and FIG. 7, the motor current $I_m$ is in the leading phase with respect to the inverter output voltage command $V_m^*$, which is defined as positive.

[Expression 4]

$$I_m = \sqrt{2} \cdot I_{m\_rms} \cos(\theta_m) \quad (4\text{-}1)$$

$$V_m^* = \sqrt{2} \cdot V_{m\_rms}^* \cos(\theta_m - \Phi) \quad (4\text{-}2)$$

Using expressions (4-1) and (4-2), single-phase instantaneous power $P_m$ is expressed by below expression (5).

[Expression 5]

$$P_m = V_m^* \cdot I_m = 2 V_{m\_rms}^* I_{m\_rms} \cos(\theta_m) \cos(\theta_m - \Phi) \quad (5)$$

Moreover, expression (5), which is expanded by the addition theorem, is expressed by below expression (6).

[Expression 6]

$$P_m = 2 V_{m\_rms}^* I_{m\_rms} \cos(\theta_m)(\cos(\theta_m)\cos(\Phi) + \sin(\theta_m) \sin(\Phi)) = 2 V_{m\_rms}^* I_{m\_rms} \cos^2(\theta_m) \cos(\Phi) + 2 V_{m\_rms}^* I_{m\_rms} \cos(\theta_m) \sin(\theta_m) \sin(\Phi) \quad (6)$$

Furthermore, expression (6) can be transformed into below expression (7) using expressions (3-1) and (3-2), provided that $\theta_m = \theta_m\hat{}$.

[Expression 7]

$$P_m = \sqrt{2} V_{m\_rms}^* \times \sqrt{2} I_{m\_rms} \cos^2(\hat{\theta}_m) \times \cos(\Phi) + \sqrt{2} V_{m\_rms}^* \times \sqrt{2} I_{m\_rms} \cos(\hat{\theta}_m) \sin(\hat{\theta}_m) \times \sin(\Phi) = \sqrt{2} V_{m\_rms}^* \times I_p \times \cos(\Phi) + \sqrt{2} V_{m\_rms}^* \times I_q \times \sin(\Phi) \quad (7)$$

Expression (7), which is an expression of the instantaneous power, includes in particular the first term representing an instantaneous value of effective electric power and expressed by the p-axis current $I_p$ appearing in expression (3-1). The second term of expression (7) represents an instantaneous value of reactive power and is expressed by the q-axis current $I_q$ appearing in expression (3-2). Therefore, the effective electric power and the reactive power can be controlled by performing control using expression (7), specifically by individually controlling the p-axis current $I_p$ and the q-axis current $I_q$ into which the motor current $I_m$ is separated as a result of the coordinate conversion.

Although in the above description of the first coordinate conversion unit 431, the expansion of the expression is discussed based on the definitions explained in relation to expressions (3-1), (3-2), (4-1), (4-2), and FIG. 7, these definitions and the illustration are merely made for convenience of description, and thus, the definitions themselves are not essential matters of the invention.

Next, the second coordinate conversion unit 432 converting the expression using the p-q axes into the expression in terms of the single-phase alternating-current will be described. On the basis of below expression (8), the second coordinate conversion unit 432 converts a p-axis voltage command $V_p^*$ and a q-axis voltage command $V_q^*$ into the inverter output voltage command $V_m^*$ which is an alternating-current voltage. Note that expression (8) is an example of the coordinate conversion expression to obtain the inverter output voltage command $V_m^*$, and is, of course, changed in accordance with the above definitions etc. discussed in relation to the first coordinate conversion unit 431.

[Expression 8]

$$V_m^* = \sqrt{V_p^{*2} + V_q^{*2}} \; \cos\left(\theta_m + \tan^{-1}\left(\frac{V_q*}{V_p*}\right)\right) \quad (8)$$

Next, the first current control unit 411 and the second current control unit 412 will be described. The first current control unit 411 is a feedback controller performing the control such that the p-axis current $I_p$ corresponds with the p-axis current command $I_p^*$, while the second current control unit 412 is a feedback controller performing the control such that the q-axis current $I_q$ corresponds with the q-axis current command $I_q^*$. The first current control unit 411 and the second current control unit 412 can both employ a PID control system having a transfer function as expressed in, for example, below expression (9). In expression (9), $K_p$ represents a proportional gain, $K_I$ represents an integral gain, $K_d$ represents a derivative gain, and "s" represents a Laplace operator. It is needless to say that the PID control, feedback control, and the like are mentioned as examples of the control method for the purpose of describing the present description.

[Expression 9]

$$G_{PID}(s) = K_p + \frac{K_t}{s} + sK_d \quad (9)$$

Next, the air volume control unit 42 will be described. The air volume control unit 42 is a feedback controller performing the control such that the air volume estimate $\hat{Q}$ corresponds with the air volume command $Q^*$, and can employ the PID control as with the first current control unit 411 or the second current control unit 412. It is needless to say that the PID control, feedback control, and the like are examples of the control method as with the current control units 411 and 412.

Next, the air volume estimation unit 45 will be described. The following relational expression is listed as expression (9) on page 2/6 of Non Patent Literature 1 in the citation list.

[Expression 10]

$$Q = N \times f\left(\frac{I}{N^2}\right) \quad (10)$$

In expression (10), "N" represents the rotational speed and "I" represents the current. When expression (10) is applied to the present embodiment, the air volume estimate $\hat{Q}$ of the present embodiment can be expressed by below expression (11).

[Expression 11]

$$\hat{Q} = \omega_m \times f\left(\frac{I_m}{\omega_m^2}\right) \quad (11)$$

Note that, as described in the literature on the citation list, a function f representing the air volume Q is a function dependent on a fan diameter, a pressure loss condition, and the like and thus may be included as table data in the inverter control unit 4, for example. That is, any method may be adopted to obtain the air volume estimate $\hat{Q}$.

Figure 8:
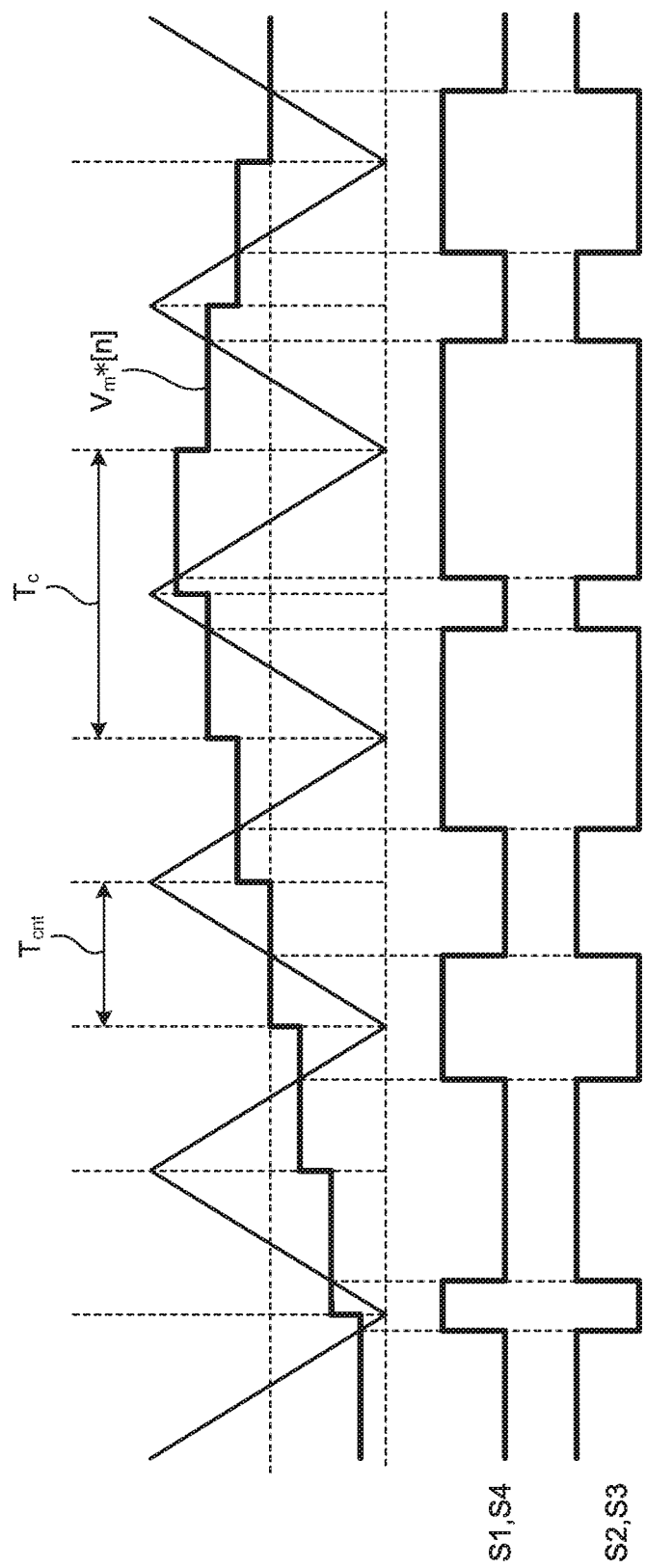
FIG. 8 is a timing diagram explaining the operation of a switching element driving signal generating unit according to the first embodiment.

Next, the switching element driving signal generating unit 46 will be described. FIG. 8 is a timing diagram explaining the operation of the switching element driving signal generating unit 46. In the upper part of FIG. 8, a thin line indicates the carrier waveform while a thick line indicates the waveform of the inverter output voltage command. In the example of FIG. 8, the control period $T_{cnt}$ is set to one-half a carrier period $T_c$. The lower part of FIG. 8 illustrates the waveforms of the driving signals S1 to S4 for driving the switching elements 211 to 214.

For the discrete control system based on the control period $T_{cnt}$ described above, the inverter output voltage command $V_m^*$ is changed discretely. In the case of the control timing n, for example, the switching element driving signals S1 to S4 are determined to be the high level or the low level on the basis of the magnitude relationship between the inverter output voltage command $V_m^*$ [n] and the carrier at the control timing n. At this time, the signals S1 and S4 are the same signals, and the signals S2 and S3 are the same signals and have the inverted waveform with respect to the waveform of the signals S1 and S4. Since the switching element has a delay time such as a rise time and a fall time peculiar to the switching element, a short circuit prevention time (dead time) is typically provided in many cases. Although the dead time is set to zero in FIG. 8, the dead time may be set to non-zero. Note that FIG. 8 merely illustrates an example of the method of generating the switching element driving signals S1 to S4, and thus, as a matter of course, any method generating a PWM signal may be used.

Figure 9:
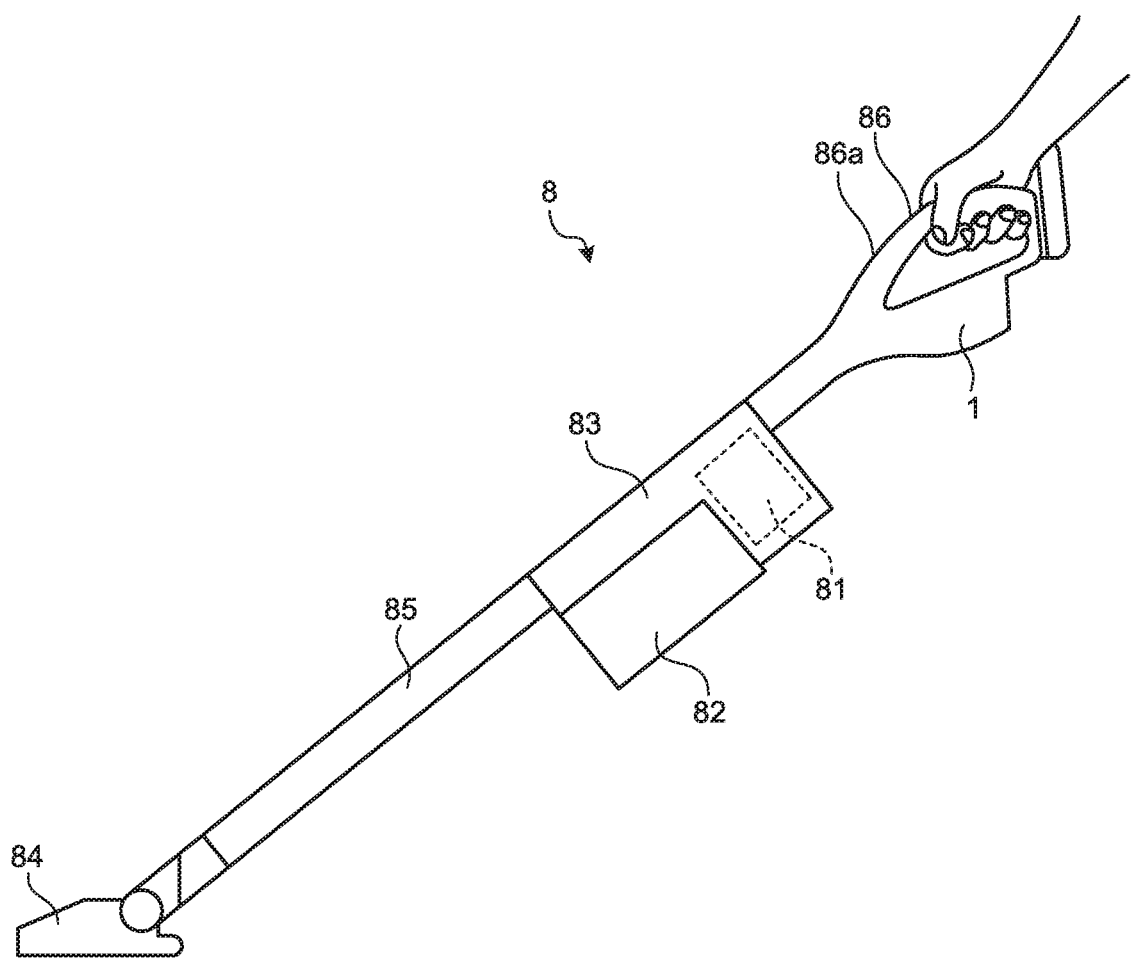
FIG. 9 is a view illustrating an example of a configuration of a vacuum cleaner as an example of application of the motor driving apparatus according to the first embodiment.

Next, the air volume command generating unit 47 will be described. FIG. 9 is a view illustrating an example of a configuration of a vacuum cleaner as an example of application of the motor driving apparatus according to the first embodiment. As illustrated in FIG. 9, a vacuum cleaner 8 includes the direct-current power supply 1 such as a battery, an electric blower 81 driven by the single-phase PM motor 3 described above, a dust chamber 82, a sensor 83, a suction opening body 84, an extension tube 85, and an operation part 86.

The vacuum cleaner 8 drives the single-phase PM motor 3 using the direct-current power supply 1 as a power supply, sucks dirt from the suction opening body 84 through the extension tube 85 into the dust chamber 82. When in use, the vacuum cleaner 8 is held by the operation part 86 and operated.

An operation switch 86a for adjusting the amount of suction of the vacuum cleaner 8 is provided in the operation part 86. A user of the vacuum cleaner 8 operates the operation switch 86a to freely adjust the amount of suction of the vacuum cleaner 8. The amount of suction set by the operation part 86 is an air volume setting value Q that is to be supplied to the air volume command generating unit 47 (see FIG. 3). The air volume setting value Q is input to the air volume command generating unit 47, and the air volume command generating unit 47 outputs the air volume command Q*. The method of setting the air volume setting value Q by the operation part 86 is given as an example in the present embodiment, and thus another method may be used. For example, there may be used a method of automatically setting the air volume setting value Q in response to sensing by the sensor 83. Either of the methods may be used.

Figure 10:
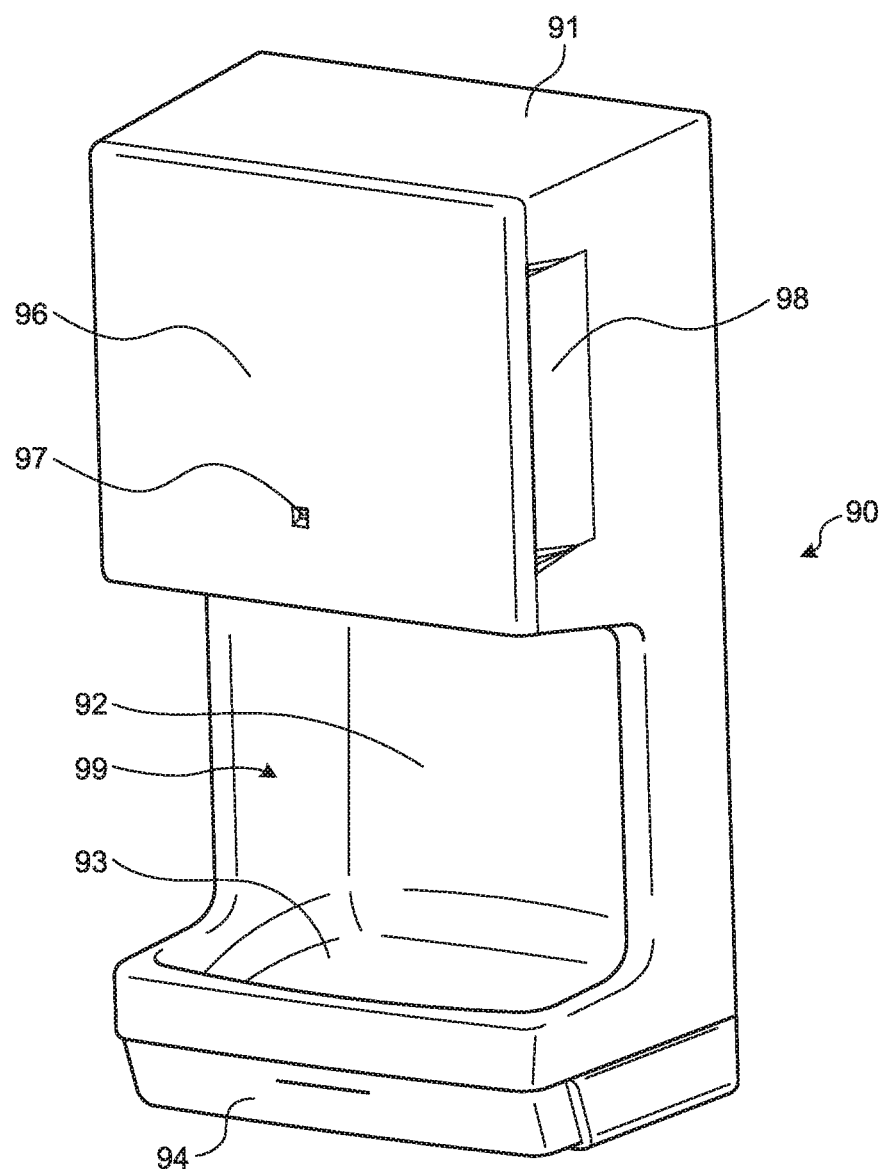
FIG. 10 is a view illustrating an example of a configuration of a hand dryer as another example of application of the motor driving apparatus according to the first embodiment.

FIG. 10 is a view illustrating an example of a configuration of a hand dryer as another example of application of the motor driving apparatus according to the first embodiment. As illustrated in FIG. 10, a hand dryer 90 includes a casing 91, a hand sensor 92, a water receiving portion 93, a drain receptacle 94, a cover 96, a sensor 97, and an air inlet 98. An electric blower (not illustrated) driven by the motor driving apparatus of the first embodiment is provided in the casing 91. The hand dryer 90 is configured to blow off water by air supplied from the electric blower when a hand is inserted into a hand insertion portion 99 above the water receiving portion 93, and store the water from the water receiving portion 93 into the drain receptacle 94. The sensor 97 is either a gyro sensor or a motion sensor, where a control system of the inverter control unit 4 may be configured to automatically set the air volume setting value Q** in response to sensing by the sensor 97.

Figure 11:
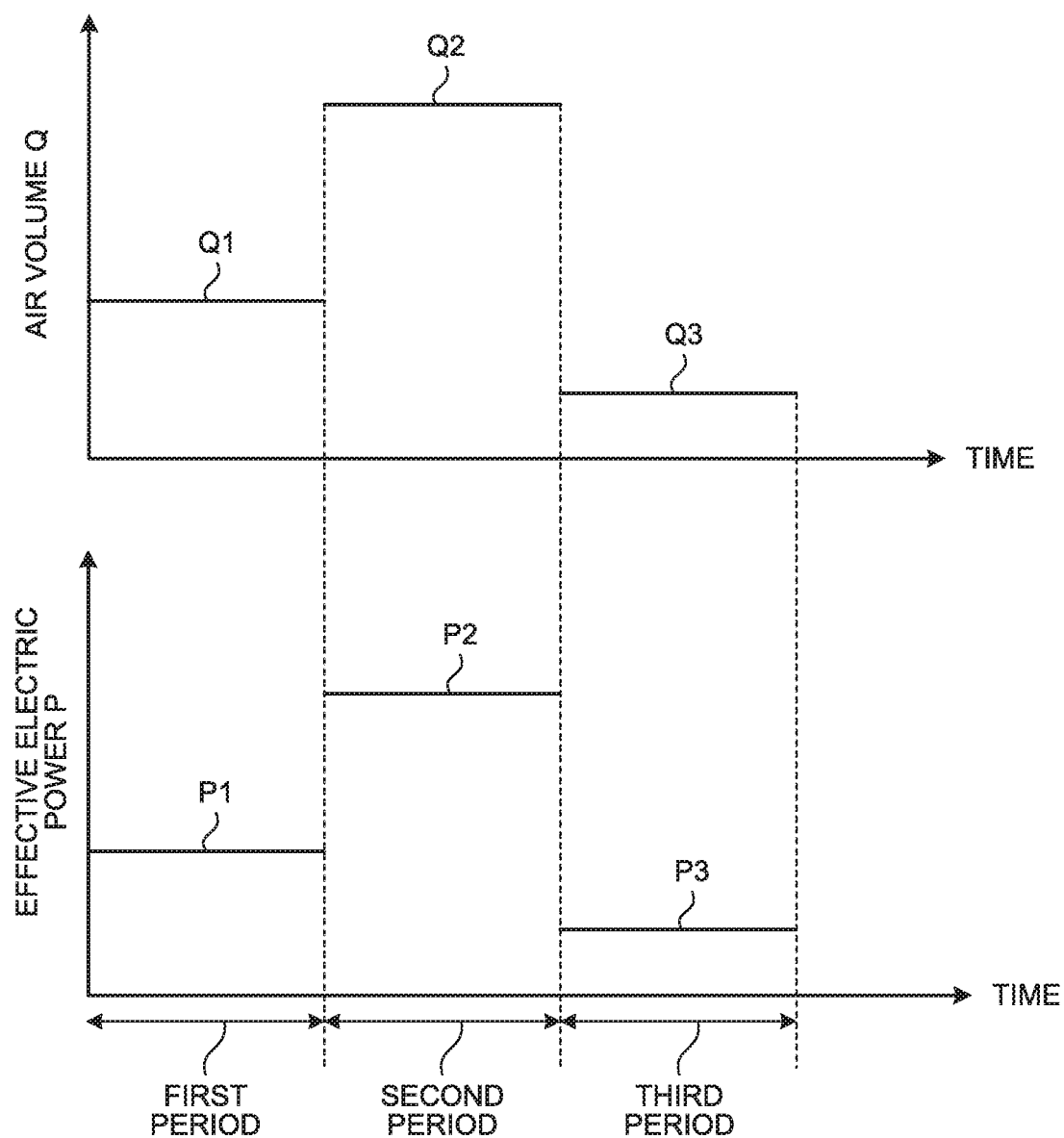
FIG. 11 is a graph illustrating a relationship between an air volume Q and effective electric power P in the control of the first embodiment.

As described above, the air volume command Q* is set by the air volume setting value Q**, the air volume estimate Q^ is controlled in accordance with the air volume command Q*, and the p-axis current $I_p$ is controlled in accordance with the air volume estimate Q^, such that the effective electric power P is ultimately controlled in accordance with the air volume Q. FIG. 11 illustrates the relationship between the air volume Q and the effective electric power P. As illustrated in the upper part of FIG. 11, Q1 indicates the air volume in a first period, Q2 indicates the air volume in a second period, and Q3 indicates the air volume in a third period. As illustrated in the lower part of FIG. 11, P1 indicates the effective electric power in the first period, P2 indicates the effective electric power in the second period, and P3 indicates the effective electric power in the third period. Assuming that in each of these periods the air volume Q corresponds with the air volume setting value Q**, the air volume Q2 is larger than the air volume Q1 so that the effective electric power P2 is accordingly controlled to be larger than the effective electric power P1, as illustrated in FIG. 11. Moreover, the air volume Q3 is smaller than the air volume Q1 so that the effective electric power P3 is controlled to be smaller than the effective electric power P1. The control system thus operates to control the effective electric power P in accordance with the air volume Q.

Next, the q-axis current command generating unit 48 will be described. The q-axis current command generating unit 48 receives input of the motor speed estimate $\omega_m\hat{}$ generated by the motor position/speed detecting unit 44 and outputs the q-axis current command $I_q^*$. The q-axis current $I_q$ is a control input for controlling the reactive power, as described above. The reactive power is an electric power that does not contribute to the actual work. Unfortunately, an increase in the reactive power causes an increase in the motor current $I_m$ and thus reduces the efficiency. Therefore, the q-axis current command $I_q^*$ is normally set to zero. However, the reactive power may be set to a value other than zero in accordance with an increase in the rotational speed when a control method such as field weakening is employed together.

Figure 12:
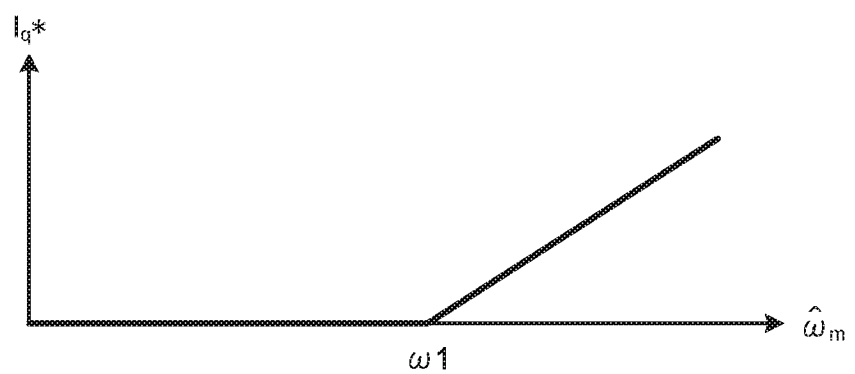
FIG. 12 is a graph illustrating an example of a case where a q-axis current command is controlled to a value other than zero in the control of the first embodiment.

FIG. 12 is a graph illustrating an example of the case where the q-axis current command $I_q^*$ is controlled to a value other than zero. As illustrated in FIG. 12, the q-axis current command $I_q^*$ may be changed at a specific rotational speed ω1 or higher. Such control can be achieved by holding the table data corresponding to the curve shown in FIG. 12 in the q-axis current command generating unit 48. The q-axis current command $I_q^*$ is changed in accordance with the rotational speed in FIG. 12. However, when the q-axis current command $I_q^*$ is determined in accordance with a driving state of the single-phase PM motor, not only the rotational speed but the air volume command Q*, the p-axis current $I_p$, the p-axis current command $I_p^*$, the motor current $I_m$, or the like may be set as an indicator for the determination. It is needless to say that, when the indicator other than the rotational speed is set as the indicator for the determination, the control system is configured such that this indicator for the determination is used as an input signal received by the q-axis current command generating unit 48.

The above configuration can control the effective electric power by the p-axis current $I_p$ such that the air volume estimate Q^ corresponds with the air volume command Q*. At the same time, the reactive power can be controlled by the q-axis current $I_q$ and a power factor at the time of driving the motor can be controlled. Through these controls, for example, the reactive power is controlled to zero, thereby reducing the motor current to the amount related only to the effective electric power. As a result, the motor current is controlled to the minimum, thereby reducing or preventing a copper loss of the motor (loss in coil resistance or the like), a conduction loss of the inverter (loss due to on-resistance or on-voltage of the switching element), and a switching loss (loss occurring when the switching element is turned on or off), such that a product having the motor driving apparatus applied thereto can have increased efficiency.

According to the motor driving apparatus of the first embodiment described above, the single-phase inverter increases or decreases the effective electric power supplied to the single-phase PM motor, thereby changing the air volume of the electric blower driven by the motor driving apparatus, such that the air volume can be controlled providing against the pulsation of the single-phase instantaneous power.

Second Embodiment

Figure 13:
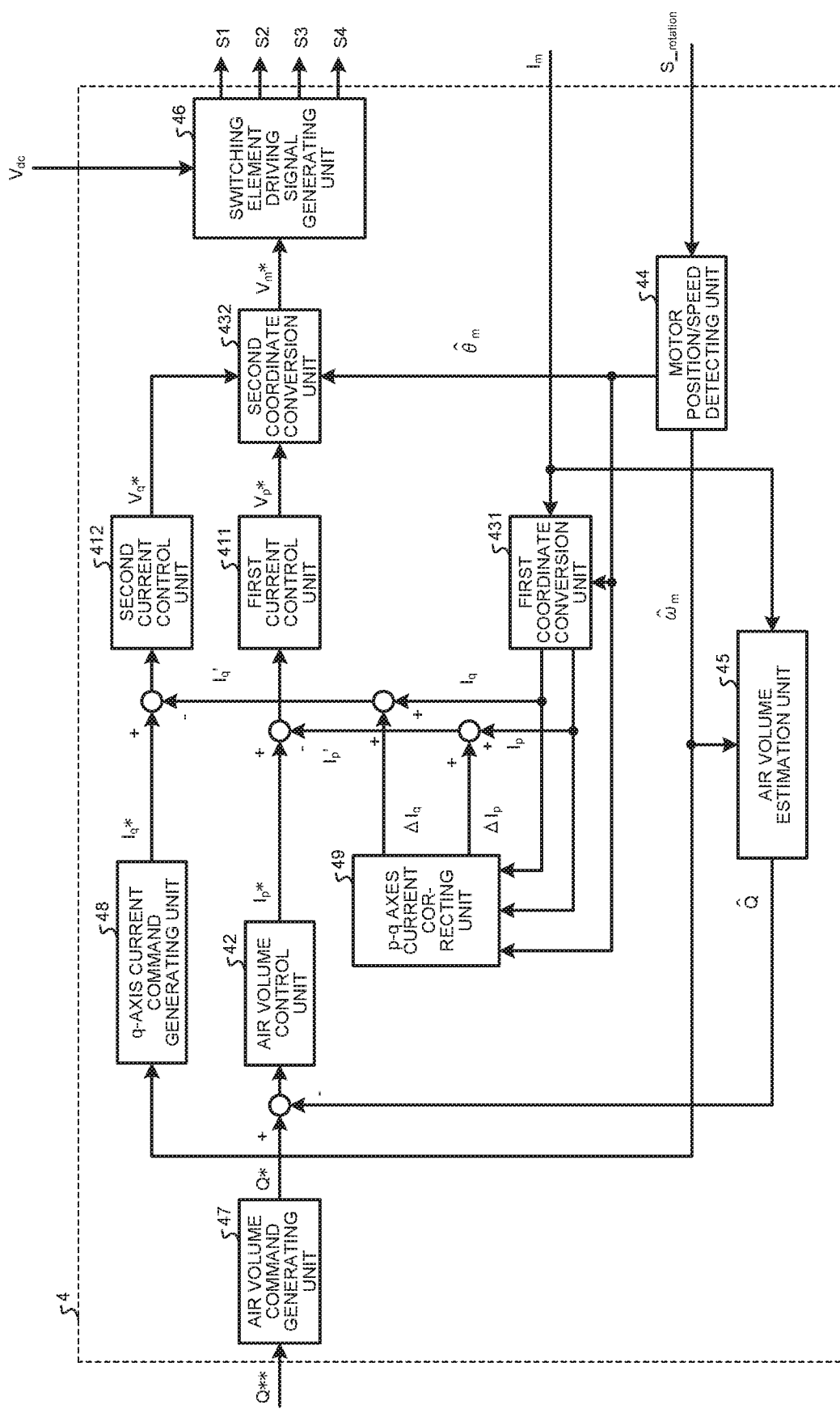
FIG. 13 is a block diagram illustrating a configuration of an inverter control unit according to a second embodiment.

FIG. 13 is a block diagram illustrating a configuration of the inverter control unit 4 according to a second embodiment. As illustrated in FIG. 13, the inverter control unit 4 of the second embodiment is different from the configuration illustrated in FIG. 3 in that a p-q axes current correcting unit 49 is added. The p-q axes current correcting unit 49 receives the p-axis current $I_p$ and the q-axis current $I_q$ which are the outputs of the first coordinate conversion unit 431, and the rotor rotational position estimate $\theta_m\hat{}$ which is the output of the motor position/speed detecting unit 44. The p-q axes current correcting unit 49 generates a p-axis current correction amount $\Delta I_p$ and a q-axis current correction amount $\Delta I_q$ on the basis of these inputs received by the p-q axes current correcting unit 49. The p-axis current correction amount $\Delta I_p$ and the q-axis current correction amount $\Delta I_q$ are correction values for suppressing pulsation of the p-axis current $I_p$ and the q-axis current $I_q$, respectively. The p-axis current correction amount $\Delta I_p$ and the q-axis current correction amount $\Delta I_q$ are added to the p-axis current $I_p$ and the q-axis current $I_q$, respectively, for input to the corresponding current control units, namely, the first current control unit 411 and the second current control unit 412. Note that the other configurations are identical or equivalent to those in FIG. 3 and are thus denoted by the same reference numerals as those in FIG. 3, whereby a redundant description will be omitted.

Next, the operation of the p-q axes current correcting unit 49 will be described. First, the conversion expression (expression (3-1)) used in the first coordinate conversion unit 431 for performing the coordinate conversion to convert the motor current $I_m$ into the p-axis current $I_p$ is reproduced below.

[Expression 12]

$$I_p = I_m \cos(\hat{\theta}_m) \qquad (3\text{-}1)(\text{reproduced})$$

The motor current $I_m$ is defined by expression (4-1) as described above. Substituting expression (4-1) into expression (3-1) yields below expression (13).

[Expression 13]

$$\begin{aligned} I_p &= \sqrt{2}\, I_{m\_rms} \cos(\hat{\theta}_m) \times \cos(\hat{\theta}_m) \\ &= \sqrt{2}\, I_{m\_rms} \left( \frac{1 - \cos(2\hat{\theta}_m)}{2} \right) \\ &= \frac{\sqrt{2}\, I_{m\_rms}}{2} - \frac{\sqrt{2}\, I_{m\_rms} \cos(2\hat{\theta}_m)}{2} \end{aligned} \qquad (13)$$

Likewise, the conversion expression (expression (3-2)) used in the second coordinate conversion unit 432 for performing the coordinate conversion to convert the motor current $I_m$ into the q-axis current $I_q$ is reproduced below.

[Expression 14]

$$I_q = I_m \sin(\hat{\theta}_m) \qquad (3\text{-}2)(\text{reproduced})$$

As with the p-axis current $I_p$, Substituting expression (4-1) into expression (3-2) yields below expression (15).

[Expression 15]

$$\begin{aligned} I_q &= \sqrt{2}\, I_{m\_rms} \cos(\hat{\theta}_m) \times \sin(\hat{\theta}_m) \\ &= \frac{\sqrt{2}}{2} I_{m\_rms} \sin(2\hat{\theta}_m) \end{aligned} \qquad (15)$$

As can be seen from above expressions (13) and (15), the p-axis current $I_p$ and the q-axis current $I_q$ change at a frequency twice as high as the motor speed $\omega_m$. The first term of expression (13) for the p-axis current $I_p$ is a direct current component and determines time-averaged effective electric power. On the other hand, the second term equals zero when time averaged, and thus does not contribute to the time-averaged effective electric power.

As described above, the p-axis current $I_p$ and the q-axis current $I_q$ change according to expressions (13) and (15). This change causes the p-axis voltage command $V_p^*$ and the q-axis voltage command $V_q^*$ to change with the similar components, so that the motor current $I_m$ also undergoes fluctuations, or pulsation. Moreover, the output torque of the motor is proportional to the motor current $I_m$, the pulsation of the motor current $I_m$ causes the pulsation of the motor speed $\omega_m$, resulting in noise being made in the single-phase PM motor 3.

Figure 14:
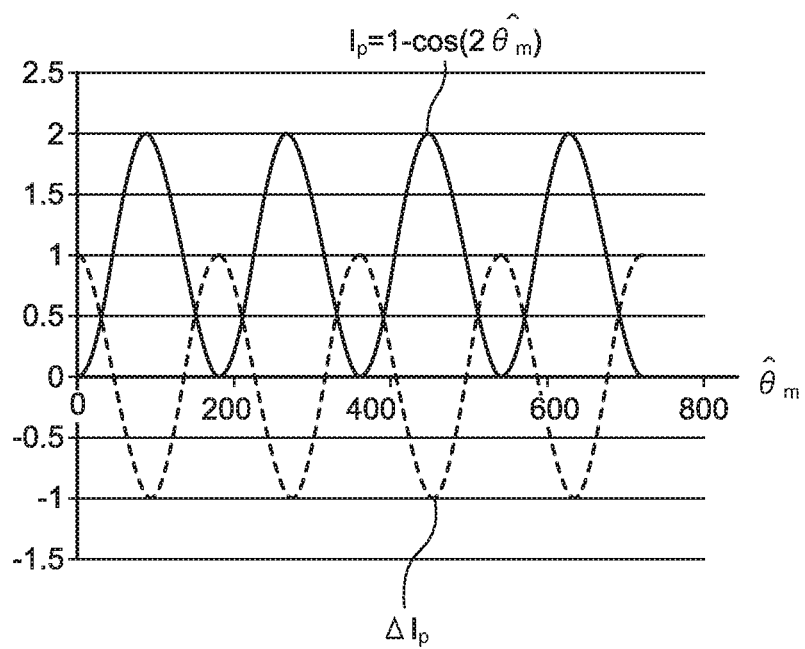
FIG. 14 is a graph explaining a relationship between a p-axis current and a p-axis current correction amount according to the second embodiment.

FIG. 14 is a graph explaining a relationship between the p-axis current $I_p$ and the p-axis current correction amount $\Delta I_R$. In FIG. 14, a solid line represents the waveform of the current expressed by expression (13) (note that coefficient $\sqrt{2}\, I_{m\_rms}$ is one ($\sqrt{2}\, I_{m\_rms}=1$) in FIG. 14). A broken line represents the waveform of a correction component, namely, the waveform of the p-axis current correction amount $\Delta I_p$ that cancels the pulsation component included in the solid line waveform, where the p-axis current correction amount $\Delta I_p$ is expressed by below expression (16) (note that coefficient $\sqrt{2}\, I_{m\_rms}$ is one ($\sqrt{2}\, I_{m\_rms}=1$) in FIG. 14).

[Expression 16]

$$\Delta I_p = \frac{\sqrt{2}}{2} I_{m\_rms} \cos(2\hat{\theta}_m) \qquad (16)$$

Adding expression (13) representing the pre-correction p-axis current $I_p$ and expression (16) representing the p-axis current correction amount $\Delta I_p$ gives a value "$\sqrt{2}\, I_{m\_rms}/2$", so that an instantaneous value of the effective electric power component of the motor current $I_m$ is controlled to be constant and the pulsation component of the p-axis current $I_p$ is removed. That is, since the pulsation of the current can be suppressed by performing the control using the corrected p-axis current $I_p'$, it becomes possible to suppress the pulsation of the p-axis voltage command $V_p^*$ and thus the distortion of p-axis voltage command $V_p^*$. The similar control system is applied to the q-axis. That is, the correction amount $\Delta I_q$ can be set for pulsation of the q-axis current $I_q$, so that an instantaneous value of the reactive power component of the motor current $I_m$ is controlled to be constant, thereby removing the pulsation component of the q-axis current $I_q$ and thus suppress the pulsation and distortion of the q-axis voltage command $V_q^*$.

Although the similar function can be implemented using a low pass filter, the low pass filter has a delay time, which limits the response speed of the current controller. On the other hand, the method according to the second embodiment can remove the pulsation component of the current one by one in each control, thereby having a shorter delay time than when the low-pass filter is used so that the current controller can be more responsive and that improved controllability can be expected.

Third Embodiment

Figure 15:
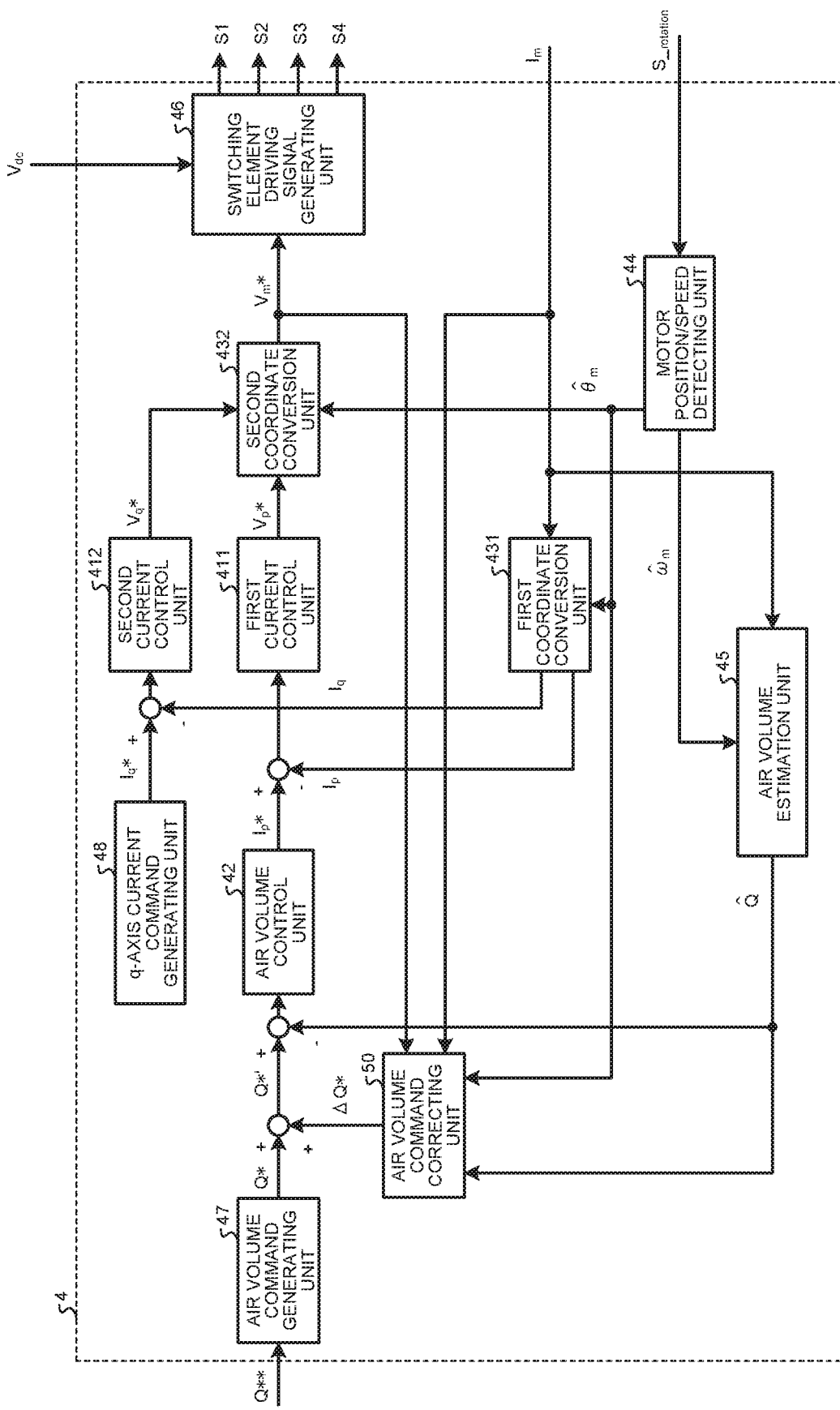
FIG. 15 is a block diagram illustrating a configuration of an inverter control unit according to a third embodiment.

FIG. 15 is a block diagram illustrating a configuration of the inverter control unit 4 according to a third embodiment. As illustrated in FIG. 15, the inverter control unit 4 of the third embodiment is different from the configuration illustrated in FIG. 3 in that an air volume command correcting unit 50 is added. The air volume command correcting unit 50 receives the motor current $I_m$, the inverter output voltage command $V_m^*$ which is the output of the second coordinate conversion unit 432, the rotor rotational position estimate $\hat{\theta}_m$ which is the output of the motor position/speed detecting unit 44, and the air volume estimate $\hat{Q}$ which is the output of the air volume estimation unit 45. The air volume command correcting unit 50 generates an air volume command correction amount $\Delta Q^*$ on the basis of these inputs received by the air volume command correcting unit 50. The air volume command correction amount $\Delta Q^*$ is the correction amount for suppressing pulsation of the instantaneous effective electric power $P_m$. The air volume command correction amount $\Delta Q^*$ is first added to the air volume command $Q^*$, and then a difference between the resultant value and the air volume estimate $\hat{Q}$ is calculated to be input to the air volume control unit 42. Note that the other configurations are identical or equivalent to those in FIG. 3 and are thus denoted by the same reference numerals as those in FIG. 3, whereby a redundant description will be omitted.

Next, the operation of the air volume command correcting unit 50 will be described. First, expression (7) of the single-phase instantaneous power $P_m$ is reconsidered. Substituting expressions (13) and (15) into the p-axis current $I_p$ and the q-axis current $I_q$ in expression (7) yields below expression (17).

[Expression 17]

$$P_m = \sqrt{2}\,V_{m\_rms}* \times \left\{ \frac{\sqrt{2}\,I_{m\_rms}}{2} - \frac{\sqrt{2}\,I_{m\_rms}\cos(2\hat{\theta}_m)}{2} \right\} \times \cos(\Phi) + V_{m\_rms}* \times I_{m_*}\sin(2\hat{\theta}_m) \times \sin(\Phi) \quad (17)$$

As described above, the first term of expression (17) represents the instantaneous effective electric power, and the second term represents the instantaneous reactive power. Hereinafter, the instantaneous effective electric power in the first term is denoted by $P_a$, while the instantaneous reactive power in the second term is denoted by Pn. As is apparent from expression (17), the instantaneous effective electric power $P_a$ pulsates due to "$\cos(2\hat{\theta}_m)$".

A mechanical output $P_M$ of the single-phase PM motor 3 is expressed by below expression (18).

[Expression 18]

$$P_M = \omega_m \times \tau_m \quad (18)$$

In expression (18), "$\tau_m$" represents a motor torque. Since the instantaneous effective electric power Pa is a component contributing to the rotation of the single-phase PM motor 3, the pulsation of the instantaneous effective electric power $P_a$ is the pulsation of the torque $\tau_m$ or the rotational speed $\omega_m$.

Figure 16:
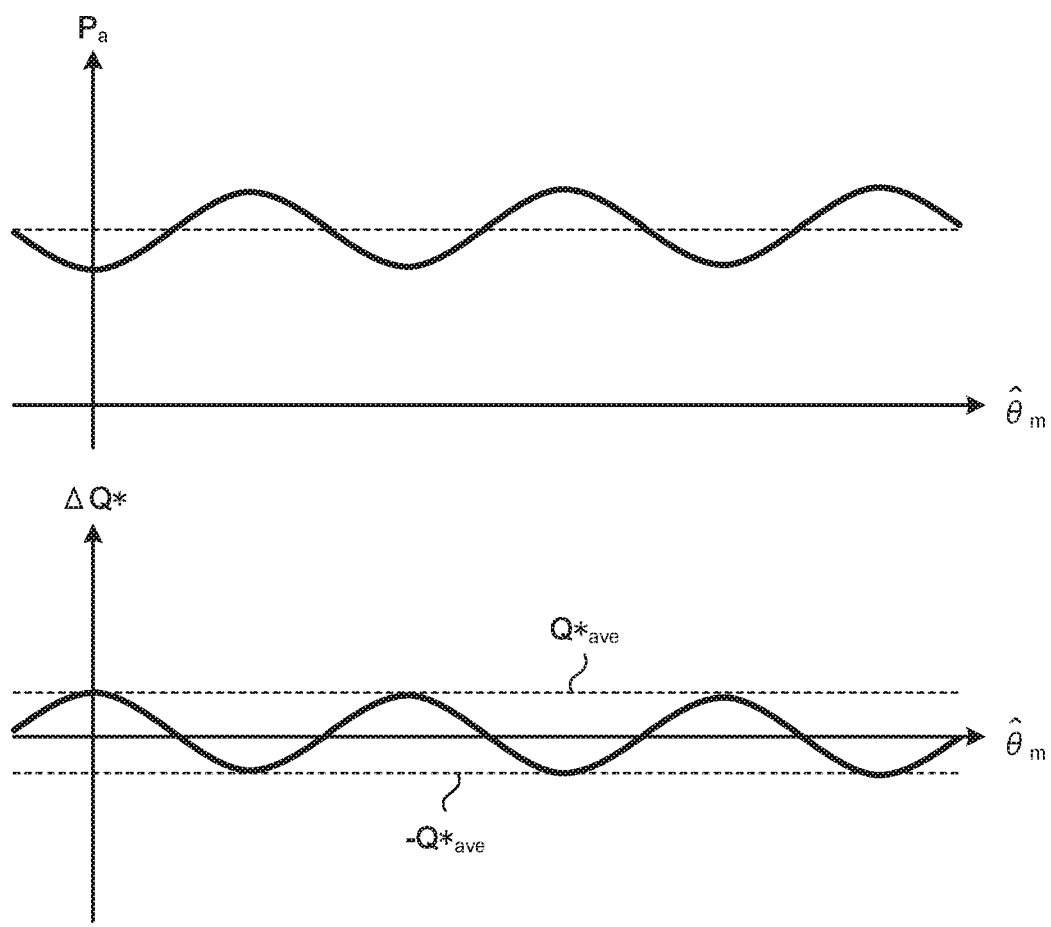
FIG. 16 is a pair of graphs illustrating an example of waveforms of instantaneous effective electric power $P_a$ and an air volume command correction amount $\Delta Q^*$.

Thus, the air volume command correcting unit 50 performs compensation control providing against the pulsation of the instantaneous effective electric power $P_a$. FIG. 16 is a pair of graphs illustrating an example of waveforms of the instantaneous effective electric power $P_a$ and the air volume command correction amount $\Delta Q^*$. As described above, the air volume command correcting unit 50 receives input of the motor current $I_m$, the inverter output voltage command $V_m*$, the air volume estimate $\hat{Q}$, and the rotor rotational position estimate $\hat{\theta}_m$. The air volume command correcting unit 50 calculates the instantaneous effective electric power $P_a$ by using expression (17) above on the basis of the motor current $I_m$, the inverter output voltage command $V_m*$, and the rotor rotational position estimate $\hat{\theta}_m$. The upper part of FIG. 16 illustrates an example of the waveform of the instantaneous effective electric power $P_a$.

The air volume command correcting unit 50 generates the air volume command correction amount $\Delta Q^*$ by using below expression (19).

[Expression 19]

$$\Delta Q^* = Q^*_{ave} \times \cos(2\hat{\theta}_m) \quad (19)$$

In expression (19), "$Q^*_{ave}$" represents a time averaged value of the air volume command $Q^*$. The lower part of FIG. 16 illustrates an example of the waveform of the air volume command correction amount $\Delta Q^*$.

In expression (19) and FIG. 16, the air volume command correction amount $\Delta Q^*$ is generated to be opposite in phase to the pulsation of the instantaneous effective electric power $P_a$, and the air volume Q and the p-axis current $I_p$ are controlled on the basis of a corrected air volume command $Q^{*'}$ obtained by correcting the air volume command $Q^*$ with the air volume command correction amount $\Delta Q^*$. Such control controls the actual air volume Q to cancel the pulsation of the instantaneous effective electric power $P_a$, thereby suppressing the pulsation of the instantaneous effective electric power $P_a$. As a result, the pulsation of the rotational speed and torque of the motor are simultaneously suppressed to thereby reduce a noise of a product having the motor driving apparatus applied thereto.

The configuration illustrated in the aforementioned embodiments merely illustrates an example of the content of the present invention, and can thus be combined with another known technique or partially omitted and/or modified without departing from the scope of the present invention.

The invention claimed is:

1. A motor driving apparatus driving an electric blower including a single-phase permanent magnet synchronous motor, the motor driving apparatus comprising:

a single-phase inverter applying an alternating-current voltage to the single-phase permanent magnet synchronous motor, the inverter including switching elements;

a position detecting unit outputting a position detecting signal that is a signal corresponding to a rotational position of a rotor of the single-phase permanent magnet synchronous motor;

a current detecting unit outputting a signal corresponding to a motor current flowing to the single-phase permanent magnet synchronous motor; and an inverter control unit receiving the position detecting signal and the motor current and outputting a driving signal to corresponding one of the switching elements of the single-phase inverter, wherein the single-phase inverter individually increases or reduces reactive power and effective electric power supplied to the single-phase permanent magnet synchronous motor, the electric blower changes an air volume by the individual increase or reduce in the reactive power and the effective electric power, and the reactive power is changed only when a rotational speed of the single-phase permanent magnet synchronous motor reaches a specific rotational speed.

2. The motor driving apparatus according to claim 1, wherein the inverter control unit includes:

a coordinate conversion unit that performs coordinate conversion of the motor current into an effective electric power component and a reactive power component; and a first current control unit that controls the effective electric power component of the motor current, and the effective electric power component of the motor current is controlled in accordance with the air volume.

3. The motor driving apparatus according to claim 2, wherein the first current control unit includes a PID feedback controller configured to perform control based on a p-axis current ($I_p$) which is obtained as a result of the coordinate conversion of the motor current ($I_m$) to separate the p-axis current ($I_p$) and the q-axis current ($I_q$).

4. The motor driving apparatus according to claim 1, wherein the inverter control unit includes:

a coordinate conversion unit that performs coordinate conversion of the motor current into an effective electric power component and a reactive power component; and a second current control unit that controls the reactive power component of the motor current, and the reactive power component of the motor current is controlled in accordance with a driving state of the single-phase permanent magnet synchronous motor.

5. The motor driving apparatus according to claim 4, wherein the driving state of the single-phase permanent magnet synchronous motor is the motor current flowing to the single-phase permanent magnet synchronous motor.

6. The motor driving apparatus according to claim 4, wherein the driving state of the single-phase permanent magnet synchronous motor is the rotational speed of the single-phase permanent magnet synchronous motor.

7. The motor driving apparatus according to claim 4, wherein the second current control unit includes a PID feedback controller configured to perform control based on a q-axis current ($I_q$) which is obtained as a result of the coordinate conversion of the motor current ($I_m$) to separate the p-axis current ($I_p$) and the q-axis current ($I_q$).

8. The motor driving apparatus according to claim 1, wherein the inverter control unit includes a current correcting unit that corrects the effective electric power component of the motor current and the reactive power component of the motor current, and the current correcting unit corrects at least one of the effective electric power component and the reactive power component in accordance with the motor current and the rotating position of the rotor of the single-phase permanent magnet synchronous motor.

9. The motor driving apparatus according to claim 8, wherein the inverter control unit controls at least one of an instantaneous value of the effective electric power component of the motor current and an instantaneous value of the reactive power component of the motor current to be constant.

10. The motor driving apparatus according to claim 1, wherein the inverter control unit includes an air volume command generating unit that generates an air volume command, and the air volume command generating unit generates the air volume command in accordance with an instantaneous value of the effective electric power supplied to the single-phase permanent magnet synchronous motor.

11. A vacuum cleaner equipped with the motor driving apparatus according to claim 1.

12. A hand dryer equipped with the motor driving apparatus according to claim 1.

13. The motor driving apparatus according to claim 1, wherein the reactive power and the effective electric power are individually controlled by separating a p-axis current ($I_p$) and a q-axis current ($I_q$) which are obtained as a result of coordinate conversion of the motor current ($I_m$) to individually control the p-axis current ($I_p$) and the q-axis current ($I_q$) which have been separated.

* * * * *